United States Patent
Laisement et al.

(10) Patent No.: US 6,860,669 B2
(45) Date of Patent: Mar. 1, 2005

(54) DEVICE FOR CLAMPING A MEMBER ADJUSTABLE RELATIVE TO A SUPPORT ASSEMBLY

(75) Inventors: André Laisement, La Chapelle Encherie (FR); Sylvain Antigny, Vendome (FR)

(73) Assignee: Nacam France S.A., Vendome (FR)

( * ) Notice: Subject to any disclaimer, the term of this patent is extended or adjusted under 35 U.S.C. 154(b) by 6 days.

(21) Appl. No.: 10/458,207

(22) Filed: Jun. 11, 2003

(65) Prior Publication Data

US 2003/0226943 A1 Dec. 11, 2003

Related U.S. Application Data

(63) Continuation of application No. PCT/FR01/04026, filed on Dec. 14, 2001.

(30) Foreign Application Priority Data

Dec. 26, 2000 (FR) .......................................... 00 17256

(51) Int. Cl.⁷ ................................................ F16B 7/10
(52) U.S. Cl. ............................... 403/109.1; 403/322.1; 403/322.4; 403/374.3; 403/374.5; 280/775; 74/492; 74/493
(58) Field of Search ............................... 403/188, 190, 403/109.1, 109.7, 321, 373, 322.1, 322.4, 374.1, 374.2, 374.3, 374.5; 280/775; 74/492, 493

(56) References Cited

U.S. PATENT DOCUMENTS

| | | | | |
|---|---|---|---|---|
| 3,825,358 A | * | 7/1974 | Eisenhardt et al. | 403/188 |
| 5,927,152 A | * | 7/1999 | Marzio et al. | 74/493 |
| 6,357,318 B1 | * | 3/2002 | Koellisch et al. | 74/493 |
| 6,467,807 B2 | * | 10/2002 | Ikeda et al. | 280/775 |

FOREIGN PATENT DOCUMENTS

FR          9806063          11/1999

* cited by examiner

Primary Examiner—John R. Cottingham
Assistant Examiner—Michael P. Ferguson
(74) Attorney, Agent, or Firm—Lawrence E. Laubscher, Sr.

(57) ABSTRACT

The invention concerns a device for clamping a system adjusting the position of a member (30) relative to a support assembly (6). The adjustment system can adjust in height and/or in depth an automobile vehicle steering column body-tube considered as the member. The member is disposed inside two vertical uprights (11, 12) of the support assembly. The clamping axis (5) is perpendicular to the two uprights. The device comprises a bracket (20) consisting of a base (21) and two tie-rods (22, 23) which are connected by a closure and support member (56) on one (12) of the uprights, and an external clamping rod (19) mounted on the base. A locking assembly (40), an intermediate member bearing on the upright (11) and disposed between the base (21) and the locking assembly (40), and an axial retention assembly (47) for the locking assembly that is adjusted to obtain clamped and unclamped positions, are mounted on the external clamping rod (19).

12 Claims, 5 Drawing Sheets

DEVICE FOR CLAMPING A MEMBER ADJUSTABLE RELATIVE TO A SUPPORT ASSEMBLY

REFERENCE TO RELATED APPLICATION

This application is a continuation of the PCT International Application No. PCT/FR01/04026 filed Dec. 14, 2001, which is based on the French Application No. 00/17256 filed Dec. 26, 2000.

BACKGROUND OF THE INVENTION

1—Field of the Invention

The present invention relates to a clamping device of a system for adjusting the position of a first member relative to a support assembly considered as fixed. The clamping device has a clamping axis that is substantially perpendicular to the axis of the first member and to the two uprights of the support assembly between which said first member is disposed. This clamping device of a position adjustment system can be applied in particular to an automobile vehicle steering column which can be adjusted in height and/or in depth in the vertical plane.

2—Description of the Prior Art

There exist steering columns adjustable in height and/or in depth which include a system for adjusting the position of the steering column relative to a support member connected to the chassis of the automobile vehicle. This position adjustment system includes a clamping device having two positions: an unlocked or unclamped position enabling adjustment of the steering column to the required position, and a locked or clamped position once the latter position has been selected. In prior art systems, the clamping device of the system for adjusting the steering column of the automobile vehicle has a clamping rod whose axis is the clamping axis and which is disposed underneath the first member or body-tube of the steering column. This clamping device has an operating handle and a locking assembly, for example a cam assembly, disposed at one of the ends of the clamping rod. This clamping rod passes through the two uprights of the support assembly. This type of support assembly and architecture has an overall size that is problematical, as much for the difficulty of installing a steering column in a vehicle architecture when the clamping rod is on top of the column as for the safety in the event of an accident of the driver, whose impact knees on the support, when the clamping rod is positioned underneath the column.

OBJECT OF THE INVENTION

The object of the present invention is to propose a clamping device that avoids the problems described above and whose clamping axis can be disposed at any position, regardless of the overall size of the steering column, in order to free up the area located underneath the steering column.

SUMMARY OF THE INVENTION

According to a mode of embodiment of the invention, the clamping device relates to a system for adjusting the position of one member relative to a support assembly considered as fixed. The member has an axis and the support assembly consists of two uprights connected to each other by a connecting member. The two uprights are substantially parallel to each other. The member is disposed inside the two uprights of the support assembly, so that the two uprights are substantially parallel to the axis of the member. Said position adjustment system is locked in the selected position by said clamping device, whose clamping axis is substantially perpendicular to the two uprights and to the axis of the member.

The clamping device includes:
a bracket consisting of:
a base outside one of the uprights, and
two tie-rods passing through the two uprights
a closure and bearing member outside the other upright, said closure and bearing member connecting the two tie-rods with assembly means and bearing on an external face of said upright;
an external clamping rod that is mounted on the base and whose axis is the clamping axis;
a locking assembly mounted on the external clamping rod;
an intermediate bearing member that is mounted on the external clamping rod and that is disposed between the base of the bracket and the locking assembly, said intermediate bearing member bearing on an external face of the upright 11 situated on the same side as the base of the bracket;
an axial retention assembly for the locking assembly that is mounted on and fixed to the external clamping rod and that is disposed outside said locking assembly.

The axial retention assembly is adjusted along the clamping axis so that in the locked position of the clamping device:
the locking assembly bears on an external face of the intermediate bearing member, which is pushed against the external face of the upright on the same side as the base of the bracket; and
the locking assembly also pushes on an internal face of the axial retention assembly, in order to pull on the external clamping rod, which moves the bracket with the closure and bearing member, which bears on and pushes back the external face of the corresponding upright to move the two uprights toward each other to provide the required clamping.

According to the invention, the bracket can have several kinds of embodiment. In a first kind of embodiment, the bracket is obtained so that the base and the two tie-rods of the bracket constitute a one-piece component. In a second kind of embodiment, the bracket is obtained from the base and the two tie-rods which are joined together by assembly means.

Advantageously according to the invention, the assembly means of the closure and bearing member and the two tie-rods consist of two pins, each of the two pins being forced into a hole made at the end of the corresponding tie-rod and forced into a hole made on the corresponding side of the closure and bearing member. The assembly means can be so two screws or two rivets integrated or no integrated to the base for assuring their retention in position.

According to a mode of embodiment of the invention, the assembly means of the base and the two tie-rods consist of two pins, each of the two pins being forced into a hole made at the end of the corresponding tie-rod and forced into a hole made on the corresponding side of the base.

According to an embodiment of the invention, the external clamping rod is fastened to the base to constitute a one-piece component. In another embodiment of the invention, the external clamping rod is mounted in a hole through the base, said external clamping rod being provided with a head that abuts against said base.

According to an embodiment of the invention, the closure and bearing member includes at least two bearing uprights that face each other and are pressed against the external face of the corresponding upright. Each of the two bearing uprights receiving the assembly means with the end of the corresponding tie-rod.

Advantageously according to the invention, the intermediate bearing member includes two bearing uprights that face each other and are pressed against the external face of the corresponding upright around the base of the bracket.

According to an embodiment of the invention, the axial retention assembly includes an abutment with a nut and a lock-nut that are screwed onto the threaded end of the external clamping rod.

In a kind of embodiment of the invention, the locking assembly includes:
an internal cam fixed against rotation relative to the intermediate bearing member, and
an external cam that can be rotated by means of a clamping handle.

In a first kind of the embodiment of a complete structure according to the invention:
the member is an automobile vehicle steering column body-tube whose axis is the steering axis and in which a steering shaft is rotatably mounted;
the support assembly is connected to the chassis of the vehicle;
the body-tube includes a build-in device between the two uprights of the support assembly;
said build-in device consists:
of a rectangular section inserted member having a vertical portion and two horizontal portions that are welded to said body-tube, the vertical portion having a bearing surface pressed against the internal face of the corresponding upright of the support assembly, and
of a solid inserted member welded to said body-tube, the solid inserted member having the internal face that is pressed against said body-tube and whose vertical external face is the bearing face pressed against the internal face of the other upright of the support assembly.

In a second kind of the embodiment of a complete structure according to the invention:
the member is an automobile vehicle steering column body-tube whose axis is the steering axis and in which a steering shaft is rotatably mounted;
the support assembly is connected to the chassis of the vehicle;
the body-tube includes a build-in device between the two uprights of the support assembly;
said build-in device consists:
of a solid inserted member welded to said body-tube, the solid inserted member having the internal face that is pressed against said body-tube, and whose vertical external face is the bearing face pressed against the internal face of the corresponding upright of the support assembly, and
of a single wedge connected to and mounted directly on the internal face of the other upright of the support assembly, the wedge having two guide faces inclined to each other and recessed on its external face;
the corresponding upright of the support assembly also has two faces inclined to each other and projected on its internal face, said projecting inclined faces cooperating with the recessed inclined faces of the wedge to prevent rotation about the clamping axis.

The clamping device in accordance with the invention of the system for adjusting an automobile vehicle steering column therefore has the advantage of having a clamping axis that is situated within the overall vertical dimension of the body-tube, providing a smaller overall size than prior art devices. This essential aspect of the invention frees up the areas on top of and underneath the steering column, which enhances the safety of the driver in the event of an accident. Moreover, the clamping device can easily be fitted to existing steering columns.

BRIEF DESCRIPTION OF THE DRAWINGS

Other features and advantages of the present invention will become more clearly apparent on reading the following description of preferred embodiments of the invention given with reference to the corresponding accompanying drawings, in which.

DESCRIPTION OF THE PREFERRED EMBODIMENT

Figure 1:
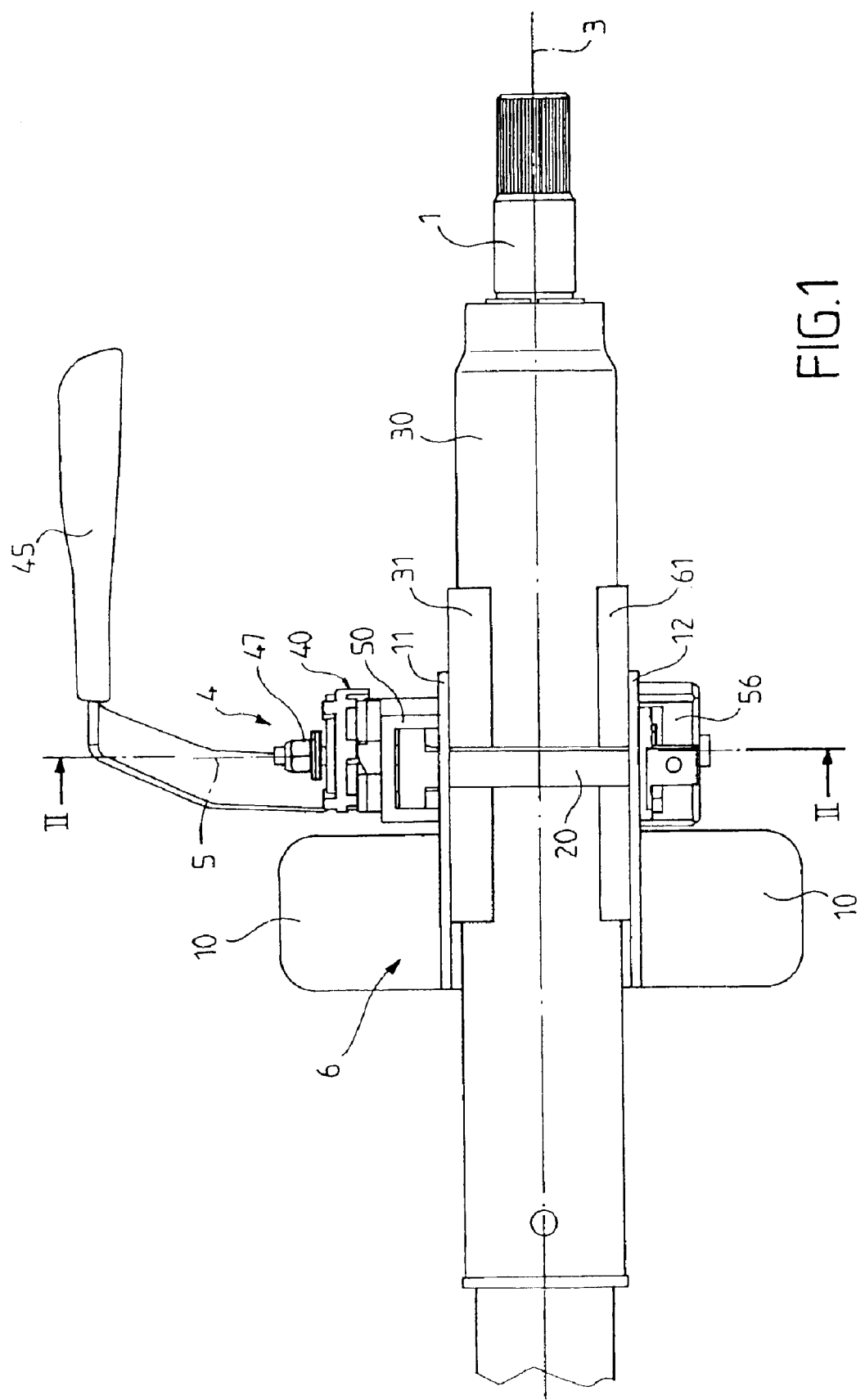
FIG. 1 is a bottom view of a clamping device according to the invention of an automobile vehicle steering column, as seen in the direction of the steering axis.

The clamping device according to the invention relates to a system 7 for adjusting the position of a first member relative to a support assembly 6 as shown in the various figures. The first member is an automobile vehicle steering column body-tube in which is rotatably mounted a steering shaft 1 whose axis is a steering axis 3. The vertical plane passing through the steering axis 3 is denoted 2.

Figure 2:
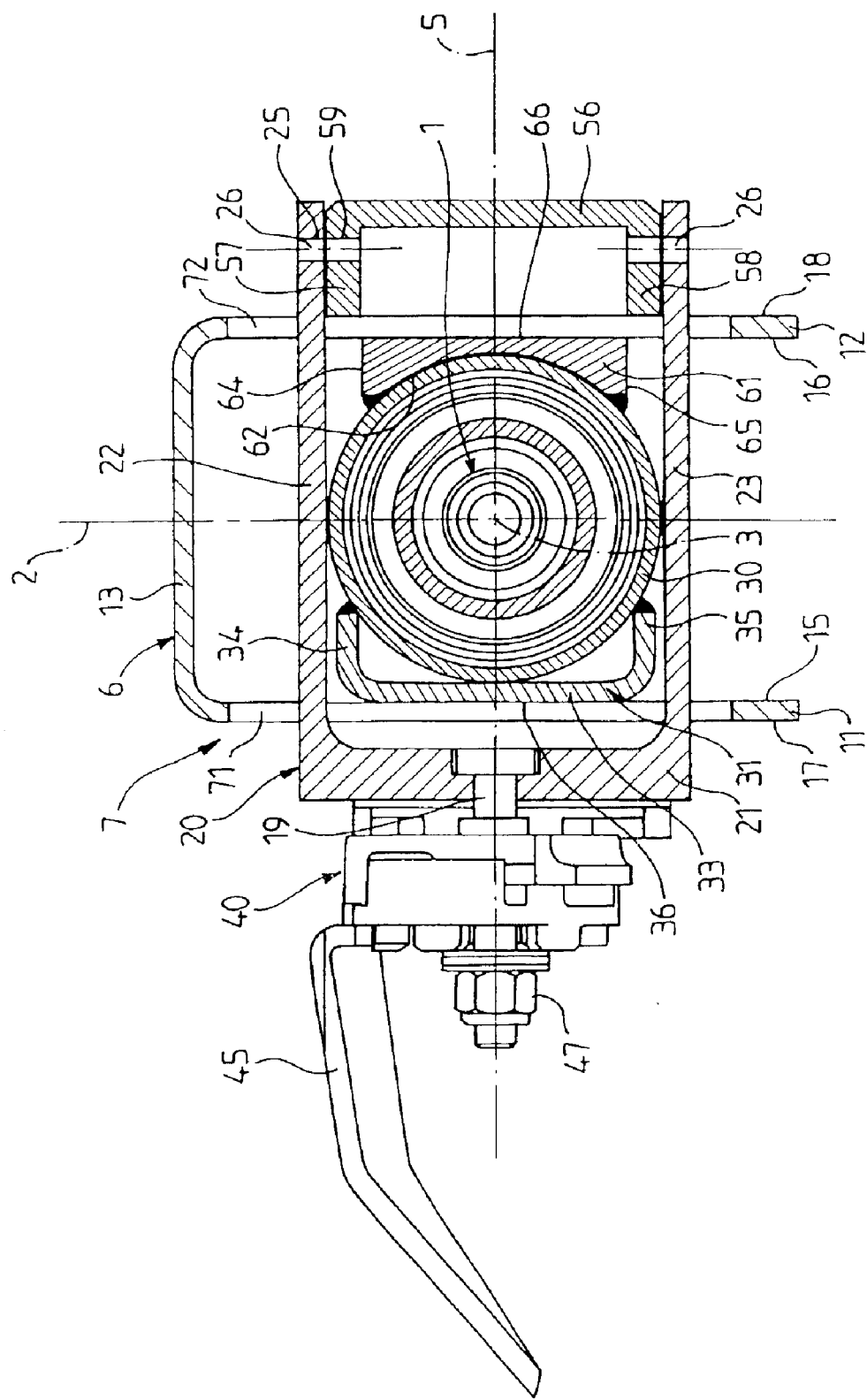
FIG. 2 is a view in cross section taken along the line II—II in FIG. 1.
Figure 3:
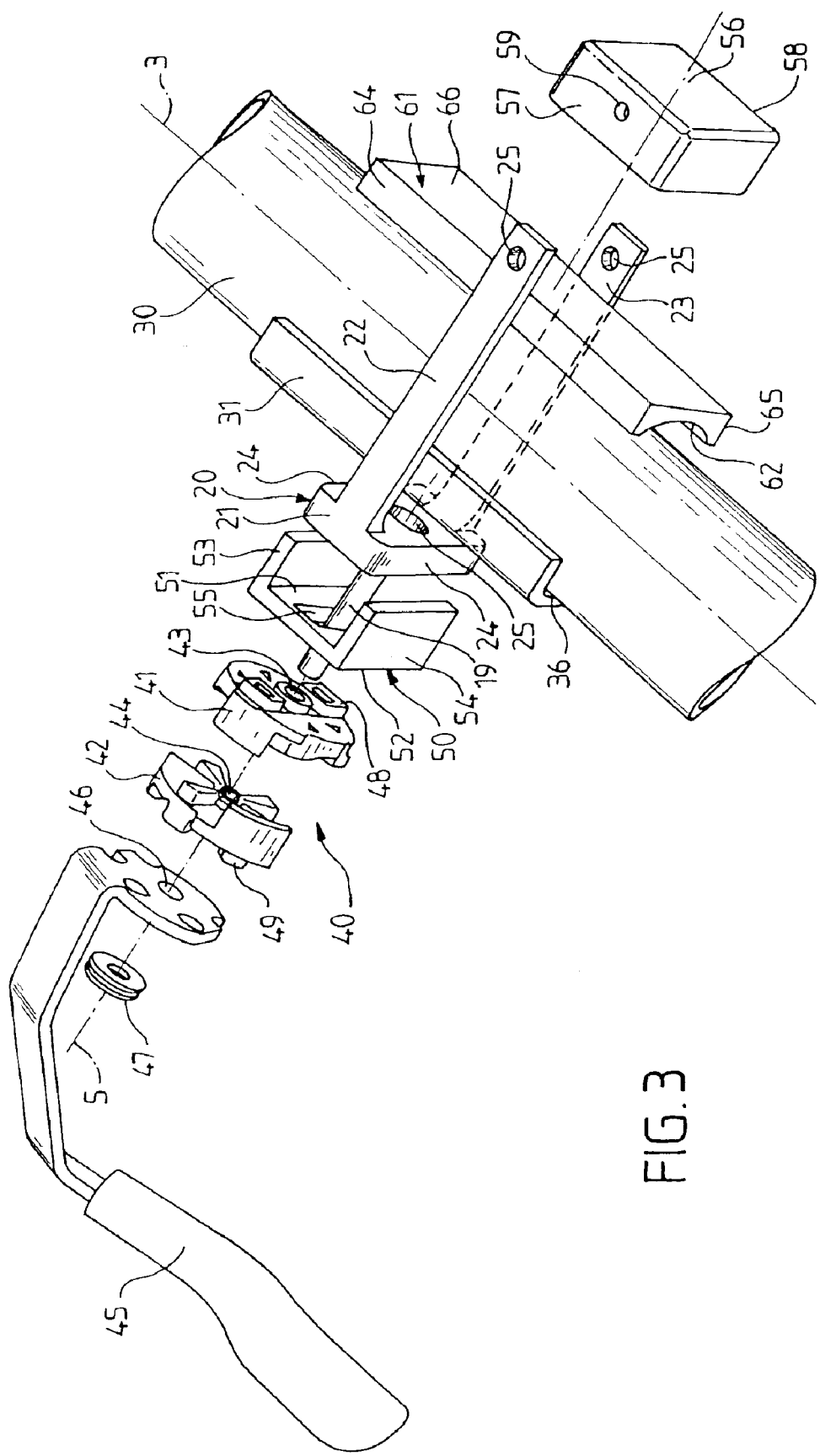
FIG. 3 is an exploded perspective view of various components of the clamping device shown in FIGS. 1 and 2.
Figure 4:
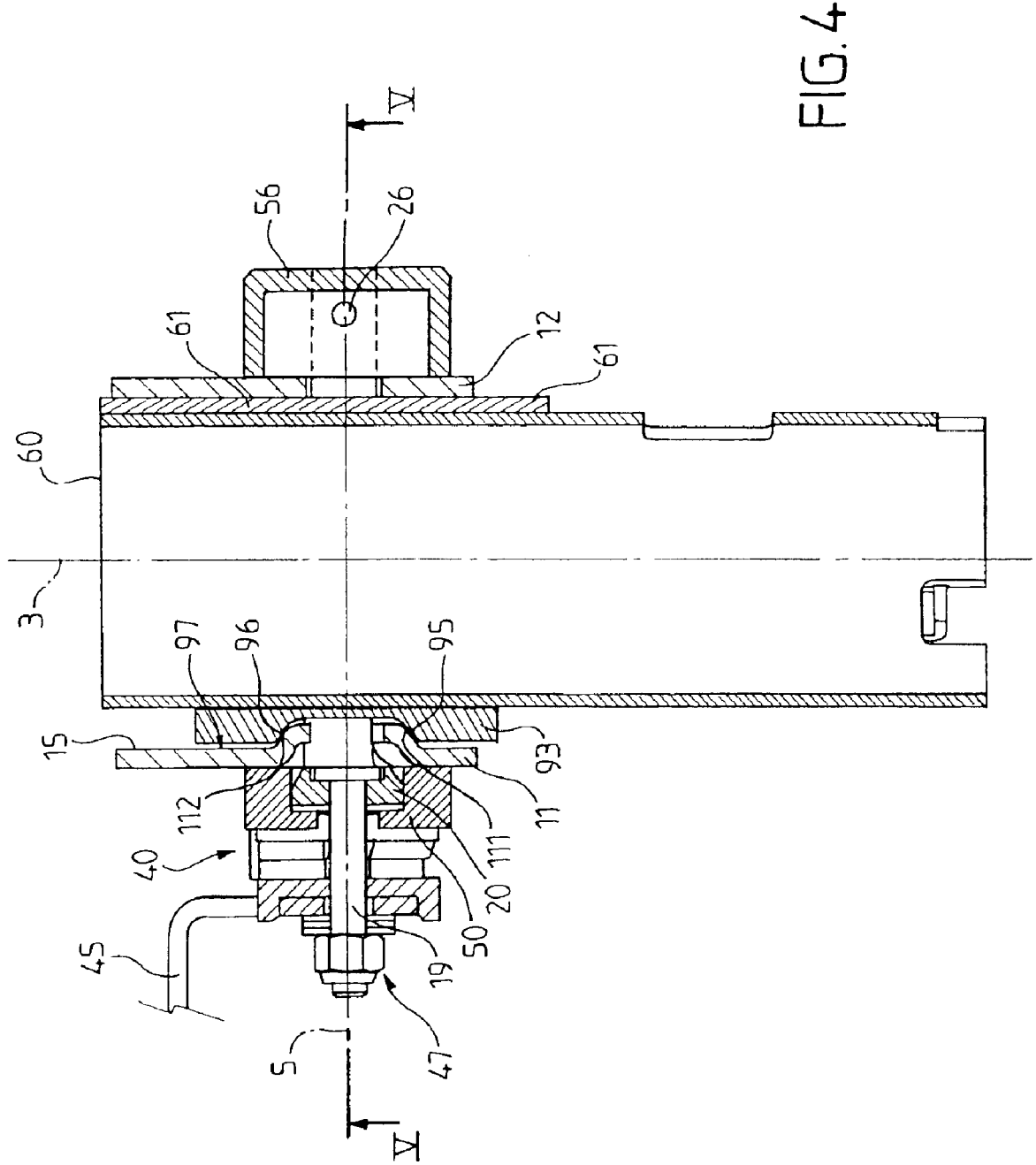
FIG. 4 is a sectional view of another embodiment of the invention in the plane of the steering axis perpendicular to the vertical plane.
Figure 5:
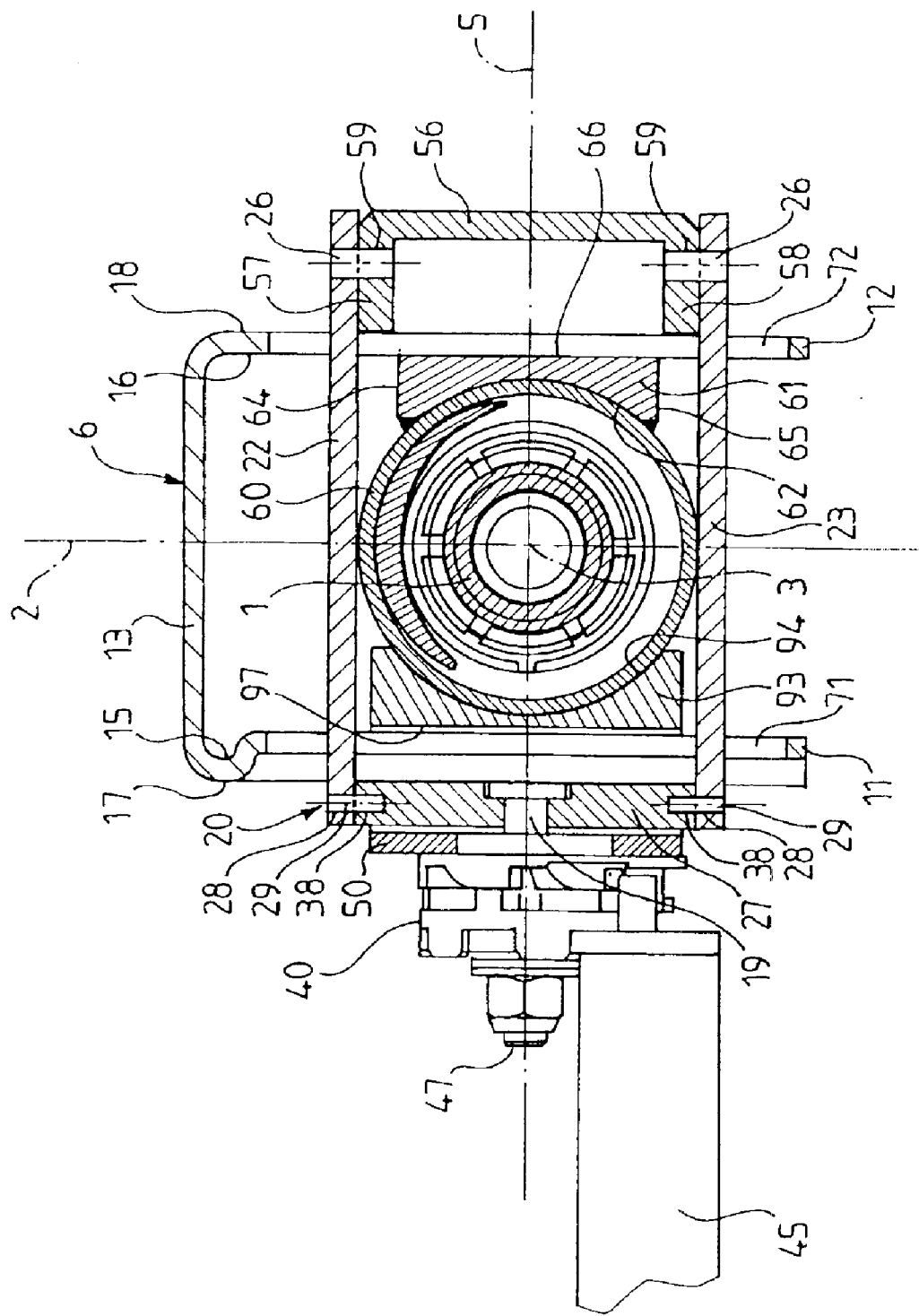
FIG. 5 is a view in section taken along the line V—V in FIG. 4.

According to the invention, the body-tube can have various structures, including the structure with the body-tube 30 shown in FIGS. 1, 2 and 3, or the structure with the body-tube 60 shown in FIGS. 4 and 5.

In all of FIGS. 1 to 5, the support assembly 6 is connected to the chassis 10 of the vehicle and is considered as fixed. The support assembly 6 includes two uprights 11 and 12 that are substantially parallel to each other and that are substantially parallel to the vertical plane 2 of the steering axis 3. The uprights 11 and 12 are connected to each other by a connecting member 13. The first member or body-tube 30 or 60 is disposed between the two uprights 11 and 12, and the steering axis 3 is in the vertical plane 2.

In the remainder of the description, and in respect of the same member, the expression "internal" or "interior" relative to the steering axis 3 of the member 30 or 60 means nearer the steering axis 3 and the term "external" or "exterior" means farther therefrom. Thus the upright 11 of the support assembly 6 has an internal face 15 and an external face 17 relative to the steering axis 3. Similarly, the upright 12 has an internal face 16 and an external face 18 relative to the same steering axis 3. Moreover, the upright 11 has a slot 71 that is oriented in the adjustment direction of the position adjustment system 7. The upright 12 also has a slot 72 that is likewise oriented in the adjustment direction.

The position adjustment device 7 is locked in the selected position by the clamping device according to the invention. The clamping device has a clamping axis 5 that is substantially perpendicular to the vertical plane 2 of the steering axis 3. The clamping axis 5 is also substantially perpendicular to the two uprights 11 and 12 of the support assembly 6. The clamping device has two positions: an unlocked position, in which the clamping device is unlocked to allow the required adjustment of the steering column, and a locked position, in which the clamping device is locked to guarantee that the selected position is maintained.

According to the invention, and like it is represented on the different figures, the clamping device includes substantially:

- a bracket 20, which is disposed out of one of the uprights for example the upright 11, the bracket 20 passing through the two uprights 11 and 12;
- a member which closes the bracket 20 and is disposed outside one of the uprights, the other upright 12 for example, said member being a closure and bearing member 56 that is connected to the bracket 20 by assembly means, and that bears on external face 18 of the upright 12;
- an external clamping rod 19 that is mounted on the bracket 20 and whose axis is the clamping axis 5;
- a locking assembly 40 that is mounted on the external clamping rod 19;
- an intermediate bearing member 50 that is mounted on the external clamping rod 19 and that is disposed between the bracket 20 and the locking assembly 40, said intermediate bearing member 50 bearing on the external face of the upright situated on the same side as the bracket 20, e.g. external face 17 of the upright 11;
- an axial retention assembly 47 for the locking assembly 40, said axial retention assembly being mounted on and fixed to the external clamping rod 19 and being outside said locking assembly 40.

The axial retention assembly 47 is adjusted along the clamping axis 5 so that in the locked position of the clamping device:

- the locking assembly 40 bears on an external face 52 of the intermediate bearing member 50, which is pushed against the external face 17 of the upright 11 situated on the same side as the base 21 or 27 of the bracket 20; and
- the locking assembly 40 also pushes on an internal face of the axial retention assembly 47, in order to pull on the external clamping rod 19, which moves the bracket 20 with the closure and bearing member 56, which bears on and pushes back the external face 18 of the corresponding upright 12 to move the two uprights 11, 12 toward each other to provide the required clamping.

In the mode of embodiment shown in FIGS. 1, 2 and 3 the first member is an automobile vehicle steering column body-tube 30 whose axis is the steering axis 3 and in which a steering shaft 1 is rotatably mounted. The support assembly 6 is connected to the chassis 10 of the vehicle.

The body-tube 30 includes a build-in device between the two uprights 11,12 of the support assembly 6. Said build-in device consists of:

- a rectangular section inserted member 31 having vertical portion 33 and two horizontal portions 34, 35 that are welded each to the other and to said body-tube 30, the vertical portion 33 having a bearing surface 36 pressed against the internal face 15 of the corresponding upright 11 of the support assembly 6, and
- a solid inserted member 6a welded to said body-tube 30, the solid inserted member 61 having the internal face 62 that is pressed against said body-tube 30 and whose vertical external face is the bearing face 66 pressed against the internal face 16 of the other upright 12 of the support assemble 6.

The bracket 20 comprises:

- a base 21 which is outside the upright 11, and
- two tie-rods 22 and 23 that pass through slot 71 in the upright 11 and slot 72 in the upright 12 ; the tie-rod 22 being disposed on top of the body-tube 30 and the tie-rod 23 being disposed underneath said body-tube 30. The bracket 20 is made so that base 21 and two tie-rods 22 and 23 constitute a one-piece component.

The closure and bearing member 56 is outside the other upright 12. The closure and bearing member 56 bears on the external face 18 of the upright 12. The closure and bearing member 56 connects the two tie-rods 22 and 23 with assembly means.

The assembly means of the closure and bearing member 56 and the two tie-rods 22 and 23 comprise two pins 26, each of the two pins 26 being forced into a hole 25 in the end of the corresponding tie-rod 22, 23 and forced into a hole 59 made on the corresponding side of the closure and bearing member 56.

The external clamping rod 19 is mounted in a hole through the base 21, said external clamping rod 19 being provided with a head that abuts against said base 21.

The closure and bearing member 56 includes at least two bearing uprights 57, 58 that face each other and that are pressed against the external face 18 of the corresponding upright 12, each of the two bearing uprights 57, 58 receiving the assembly means with the end of the corresponding tie-rod 22, 23. In the embodiment shown in the figures, the bearing uprights 57 and 58 are connected by two other bearing uprights.

The intermediate bearing member 50 includes two bearing uprights 53, 54 that face each other and that are pressed against the external face 17 of the corresponding upright 11, around the vertical faces 24 of the base 21 of the bracket 20. The intermediate bearing member 50 has an internal face 51, an external face 52, and a slot 55.

The axial retaining assembly 47 includes an abutment with a nut and a lock-nut that are screwed onto the threaded end of the external clamping rod 19.

The locking assembly 40 includes:

- an internal cam 41 fixed against rotation relative to the intermediate bearing member 50, and
- an external cam 42 that can be rotated by means of a clamping handle 45.

The internal cam 41 is provided with a tongue-shaped protuberance 48 that is engaged in the slot 55 in the intermediate bearing member 50.

The external cam 42 is provided with an excrescence 49 that is engaged in the clamping handle 45.

The internal cam 41, the external cam 42, and the clamping handle 45 are mounted on the clamping rod 19 by means of respective through-holes. 43, 44 and 46.

In the mode of embodiment shown in FIGS. 4 and 5, the first member is an automobile vehicle steering column body-tube 60 whose axis is the steering axis 3 and in which a steering shaft 1 is rotatably mounted. The support assembly 6 is connected to the chassis 10 of the vehicle.

The body-tube 60 includes a build-in device between the two uprights 11, 12 of the support assembly 6.

Said build-in device consists:

- of a solid inserted member 61 welded to said body-tube 60, the solid inserted member 61 having the internal face 62 that is pressed against said body-tube 60, and whose vertical external face is the bearing face 66 pressed against the internal face 16 of the corresponding upright 12 of the support assembly 6, and of one single wedge 93 connected to and mounted directly on the internal face 15 of the other upright 11 of the support assembly 6, the wedge 93 having two guide faces 95, 96 that are inclined to each other and recessed on its external face 97;

the corresponding upright 11 of the support assembly 6 also has two faces 111, 112 that are inclined to each other and project over its internal face 15, said projecting inclined faces 111, 112 cooperating with the recessed inclined faces 95, 96 of the wedge 93 to prevent rotation about the clamping axis 5.

The bracket 20 comprises:

a base 27 which is outside the upright 11, and two tie-rods 22 and 23 that pass through the slot 71 in the upright 11 and the slot 72 in the upright 12; the tie-rod 22 being disposed on top of the body-tube 30 and the tie-rod 23 being disposed underneath said body-tube 30. The bracket 20 is made so that base 27 and two tie-rods 22 and 23 of the bracket 20 constitute a one-piece component.

The assembly means of the base 27 and the two tie-rods 22, 23 consist of two pins 29, each of the two pins 29 being forced into a hole 28 made at the end of the corresponding tie-rod 22, 23 and forced into a hole 38 on the corresponding side of the base 27. The assembly means can equally well be two screws or two rivers, either integrated with the base to retain them in position or not.

The closure and bearing member 56 is outside the other upright 12. The closure and bearing member 56 bears on the external face 18 of the upright 12. The closure and bearing member 56 connects the two tie-rods 22 and 23 with assembly means.

The assembly means of the closure and bearing member 56 and the two tie-rods 22, 23 consist of two pins 26, each of the two pins 26 being forced into a hole 25 made at the end of the corresponding tie-rod 22, 23 and forced into a hole 59 on the corresponding side of the closure bearing member 56.

The external clamping rod 19 is attached to the base 27 to constitute a one-piece component. The connection can be effected by welding, for example.

The external clamping rod 19 is mounted in a hole through the base 27, said external clamping rod 19 being provided with a head that abuts against said base 27, said head being welded to the base 27.

The closure and bearing member 56 includes at least two bearing uprights 57, 58 that face each other and are pressed against the external face 18 of the corresponding upright 12, each of the two bearing uprights 57, 58 receiving the assembly means with the end of the corresponding tie-rod 22, 23. In the embodiment shown in the figures, the bearing uprights 57 and 58 are connected by two other bearing uprights.

The intermediate bearing member 50 includes two bearing uprights 53, 54 that face each other and are pressed against the external face 17 of the corresponding upright 11, around the base 27 of the bracket 20.

The axial retaining assembly 47 includes an abutment with a nut and a lock-nut that are screwed onto the threaded end of the external clamping rod 19.

The locking assembly 40 includes:

an internal cam 41 fixed against rotation relative to the intermediate bearing member 50, and an external cam 42 that can be rotated by means of a clamping handle 45.

According to the invention, the build-in device for the body-tube between the two uprights 11 and 12 can have any desired structure

What is claimed is:

1. A clamping device of a system for adjusting the position of an adjustable member relative to a support assembly considered as fixed, said adjustable member having an axis and said support assembly including two uprights connected to each other by a connecting member, said two uprights being substantially parallel to each other, said adjustable member being disposed inside said two uprights of said support assembly so that said two uprights are substantially parallel to said axis of said adjustable member, and said position adjusting system being locked in a selected position by said clamping device having a clamping axis which is substantially perpendicular to said two uprights and to said axis of said adjustable member, said clamping device comprising:
(a) a bracket including:
 (1) a base outside one of said two uprights, and
 (2) two tie-rods passing through said two uprights;
(b) a closure and bearing member outside the other upright, said closure and bearing member connecting said two tie-rods with assembly means and bearing on an external face of said other upright;
(c) an external clamping rod mounted on said base and coaxial with said clamping axis;
(d) a locking assembly mounted on said external clamping rod;
(e) an intermediate bearing member that is mounted on said external clamping rod and between said base of said bracket and said locking assembly and bears on an external face of said one upright situated on the same side as said base; and
(f) an axial retention assembly for said locking assembly;
(g) said axial retention assembly being mounted on and fixed to said external clamping rod and outside said locking assembly and being adjusted along said clamping axis so that in a locked position of said clamping device:
 (1) said locking assembly be as on an external face of said intermediate bearing member which is pushed against said external face of said one upright on the same side as said base; and
 (2) said locking assembly also pushes on an internal face of said axial retention assembly in order to pull on said external clamping rod which moves said bracket with said closure and bearing member which bears on and pushes back said external face of said other upright, thereby moving said two uprights toward each other to provide a required clamping.

2. A clamping device according to claim 1, wherein said base and said two tie-rods of said bracket are joined together by assembly means.

3. A clamping device according to claim 2, wherein said assembly means of said base and said two tie-rods include two pins each forced into a hole at an end of said corresponding tie-rod and forced into a hole on a corresponding side of said base.

4. A clamping device according to claim 1, wherein said assembly means of said closure and bearing member and said two tie-rods include two pins each forced into a hole at an end of the corresponding tie-rod and forced into a hole on a corresponding side of said closure and bearing member.

5. A clamping device according to claim 1, wherein said external clamping rod is fastened to said base to constitute a one-piece component.

6. A clamping device according to claim 1, wherein said external clamping rod is mounted in a hole through said base, and has a head that abuts against said base.

7. A clamping device according to claim a 1, wherein said closure and bearing member includes at least two bearing uprights that face each other and are pressed against said external face of said other upright of said support assembly, each of said two bearing uprights receiving said assembly means with an end of said corresponding tie-rod.

8. A clamping device according to claim 1, wherein said intermediate bearing member includes two bearing uprights that face each other and are pressed against said external face of said one upright of said support assembly around said base of said bracket.

9. A clamping device according to claim 1, wherein said axial retention assembly includes an abutment with a nut and a lock-nut that are screwed onto a threaded end of said external clamping rod.

10. A clamping device according to claim 1, wherein said locking assembly includes:

an internal cam fixed against rotation relative to said intermediate bearing member, and an external cam that can be rotated by mean of a clamping handle.

11. A clamping device according to claim 1, wherein:

said adjustable member is an automobile vehicle steering column body-tube coaxial with a steering axis and in which a steering shaft is rotatably mounted;

said support assembly is connected to a chassis of said vehicle;

said body-tube includes a build-in device between said two uprights of said support assembly;

said build-in device includes:

a solid inserted member welded to said body-tube and having an internal face pressed against said body-tube and an external face pressed against an internal face of said other upright of said support assembly, and a single wedge connected to and mounted directly on an internal face of said one upright of said support assembly, said wedge having two guide faces inclined to each other and recessed on an external face of said wedge;

said one upright of said support assembly also having two faces inclined to each other and projecting on an internal face of said one upright, said projecting inclined faces cooperating with said guide faces of said wedge to prevent rotation about said clamping axis.

12. A clamping arrangement for clamping an adjustable member to a fixed support assembly, comprising:

(a) an adjustable member (30; 60) having a longitudinal axis (3);

(b) support means (6) including (1) a pair of parallel spaced uprights (11, 12) arranged on opposite sides of, and parallel with the longitudinal axis of, said adjustable member, and (2) connecting means (13) connecting together said uprights;

(c) clamping bracket means (20) having a clamping axis (5) normal to said adjustable member axis, said clamping bracket means including:

(1) a base (27) arranged outside said support means;

(2) a pair of tie rods (22, 23) arranged normal to said uprights and having first ends extending from said base through opposed slots (71, 72) contained in first (11) and second (12) ones of said uprights on opposite sides of said adjustable member, respectively;

(d) closure and bearing means (56) connected between said first ends of said tie-rods on the opposite side of said support means from said base, said closure and bearing means being in engagement with the adjacent surface of said second upright;

(e) external clamping rod means (19) connected with said base and extending at one end collinearly with said clamping axis away from said clamping bracket means;

(f) intermediate bearing means (50) mounted on said clamping rod means for engagement with the adjacent surface of said first upright; and (g) locking means (40) for displacing said intermediate bearing means toward and away from said closure and bearing means, thereby to operate said uprights between clamped and released conditions relative to said adjustable member.

* * * * *